United States Patent [19]

Shaw et al.

[11] Patent Number: 5,000,297
[45] Date of Patent: Mar. 19, 1991

[54] ELECTRIC DRUM BRAKE

[75] Inventors: Schuyler S. Shaw, Dayton; Linda L. Hallinan, Centerville, both of Ohio; Robert J. Hammersmith, Rochester Hills, Mich.; Donald E. Schenk, Vandalia; Edward J. DeHoff, Huber Heights, both of Ohio; Alexander Kade, Grosse Pointe Woods, Mich.

[73] Assignee: General Motors Corporation, Detroit, Mich.

[21] Appl. No.: 353,120

[22] Filed: May 17, 1989

[51] Int. Cl.⁵ .............................................. B60T 13/74
[52] U.S. Cl. ..................................... 188/156; 188/162; 188/325
[58] Field of Search ............... 188/156, 157, 162, 328, 188/325, 326, 331, 332

[56] References Cited

U.S. PATENT DOCUMENTS

| | | | |
|---|---|---|---|
| 1,896,209 | 2/1933 | Vitale et al. | 188/162 |
| 1,990,971 | 12/1935 | Apple | 188/156 |
| 3,659,683 | 5/1972 | Betzing | 188/162 |
| 4,295,687 | 10/1981 | Becker et al. | 303/20 |
| 4,336,867 | 6/1982 | Woo | 188/332 |
| 4,392,558 | 7/1983 | Heibel | 188/325 |
| 4,762,209 | 8/1988 | Copp | 188/328 |
| 4,784,244 | 11/1988 | Carre et al. | 188/156 |
| 4,850,459 | 7/1989 | Johannesen et al. | 188/156 |

Primary Examiner—Matthew C. Graham
Attorney, Agent, or Firm—Ernest E. Helms

[57] ABSTRACT

An automotive vehicle drum brake is provided including a brake drum connected to a wheel. A backing plate is connected to the vehicle and at least one brake shoe is connected with the backing plate and is pivotally mounted with respect thereto. A non-rotative nut is mounted for linear motion with respect to the backing plate and is pivotally connected with respect to the brake shoe. A power screw is threadably engaged with the nut. The power screw is also mounted to the backing plate. An electric motor is torsionally connected with the power screw to turn the same to actuate the brakes.

12 Claims, 3 Drawing Sheets

ELECTRIC DRUM BRAKE

FIELD OF THE INVENTION

The field of the present invention is that of electrically actuated drum automotive brakes. More particularly the field of the present invention is that of an electrically actuated automotive drum brakes having mechanical parking brakes.

DISCLOSURE STATEMENT

It is known in the art to provide drum brakes for automotive vehicles. An example of an automotive drum brake is shown and described in Copp U.S. Pat. No. 4,762,209 commonly assigned.

Many developments in automotive braking having occurred recently which require the brakes to be responsive to a system controller to provide traction control and or anti-lock braking for the vehicle. Since the more recent developments in this area have utilized electronic controls, it is only a logical progression to provide a vehicle brake which also relies upon electric actuation since electric actuation provides a vehicle brake which is inherently better matched for the digital electronic controls provided in many recent automotive vehicle systems.

SUMMARY OF THE INVENTION

To provide a vehicle drum brake better matched for the advanced braking systems available on many vehicles today by providing electrical actuation, the present invention is brought forth.

The present invention provides an electrically actuated brake and furthermore provides this brake with a mechanical parking brake which is non-dependent upon electrical actuation to maintain the car in the brake condition.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
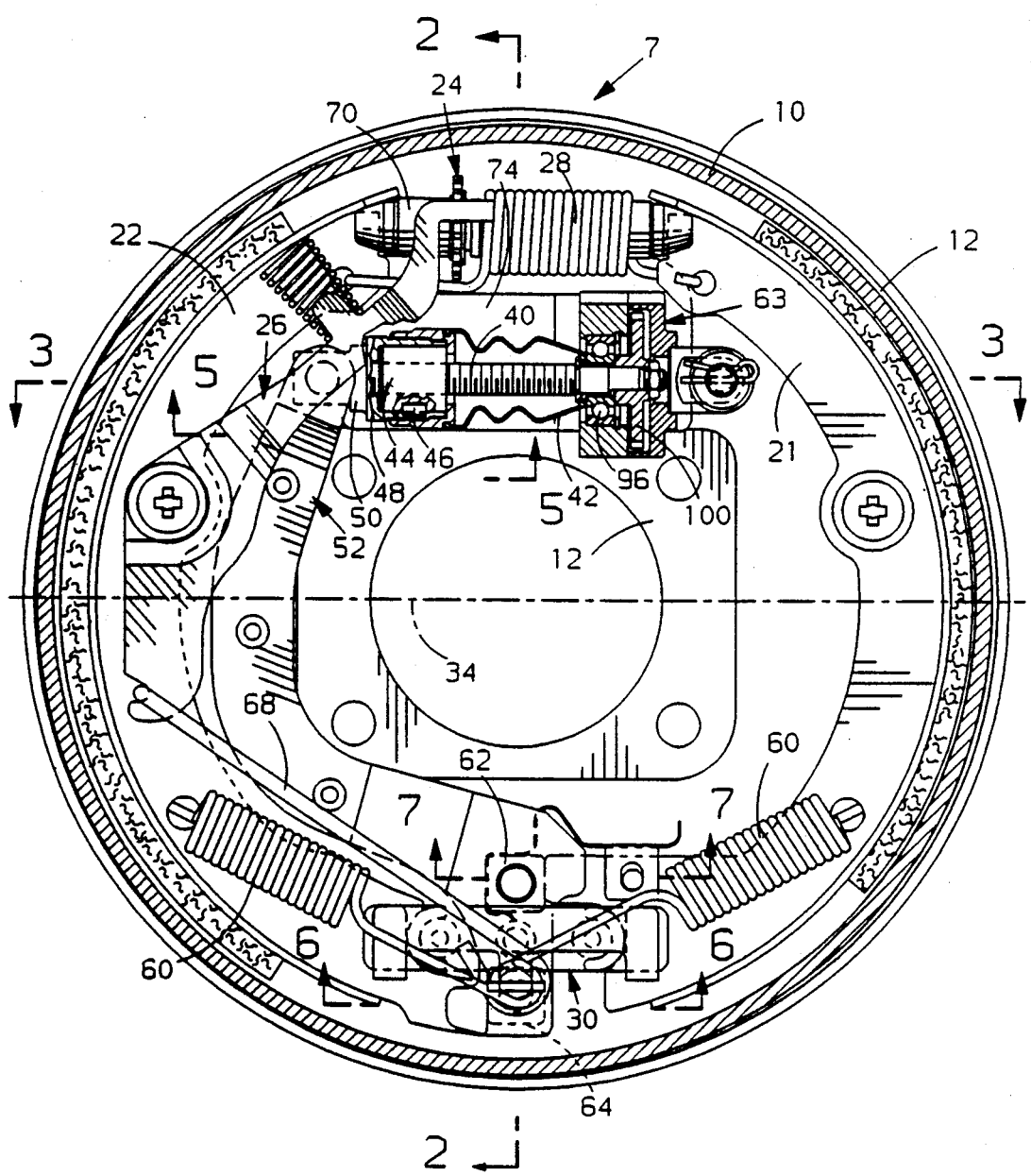
FIG. 1 is a front elevational view of a preferred embodiment brake of the present invention.
Figure 2:
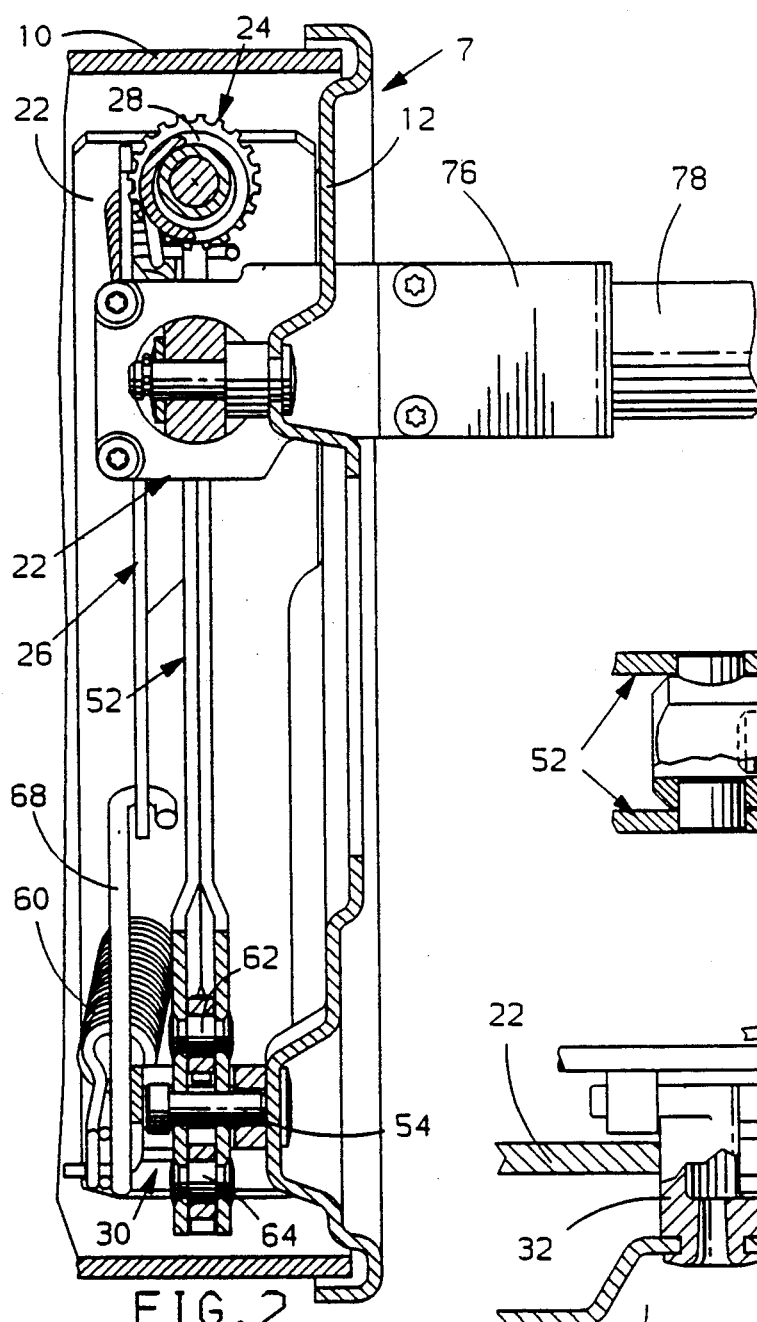
FIGS. 2, 3, 5, 6 and 7 are taken along lines 2—2, 3—3, 5—5, 6—6 and 7—7 respectively of FIG. 1.
Figure 5:
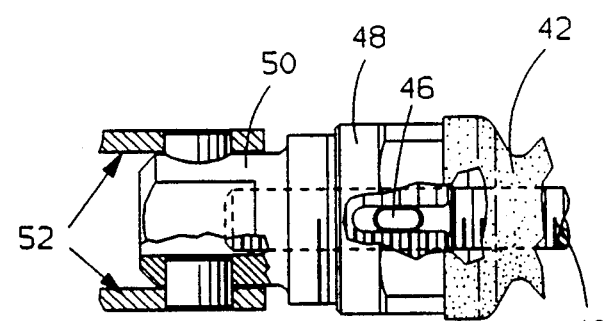
Figure 6:
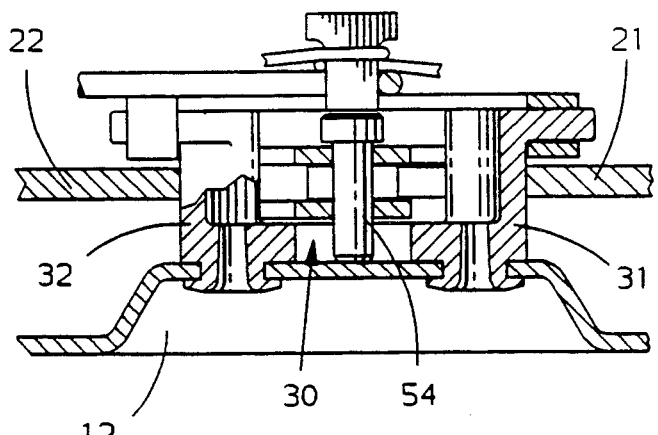
Figure 7:
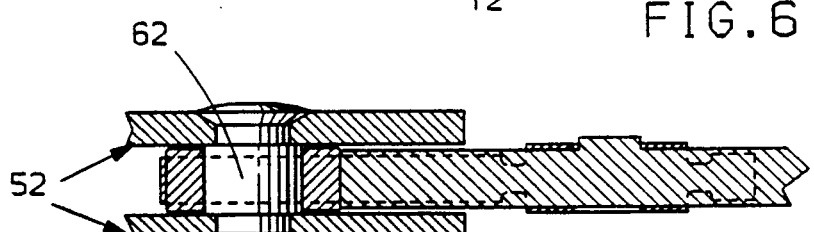
Figure 3:
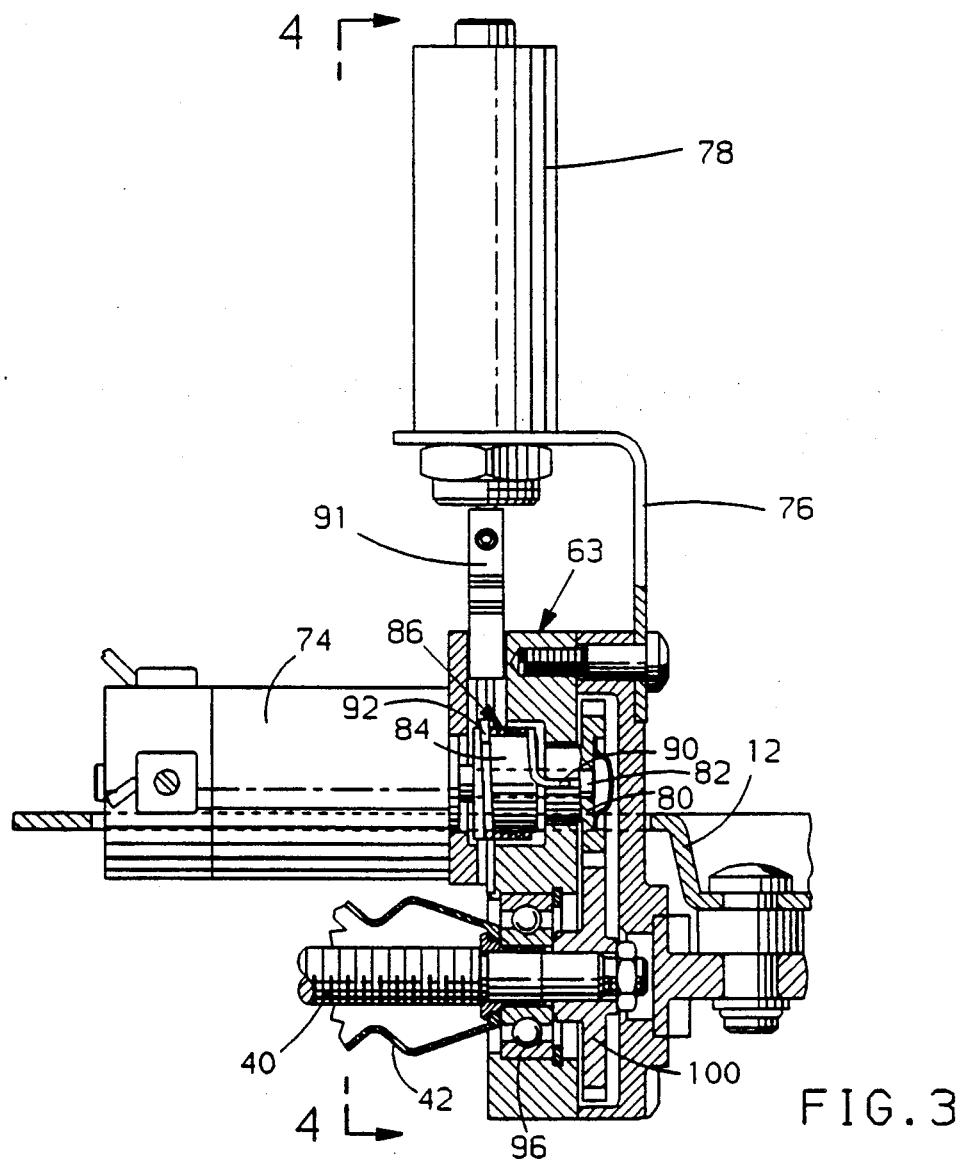
Figure 4:
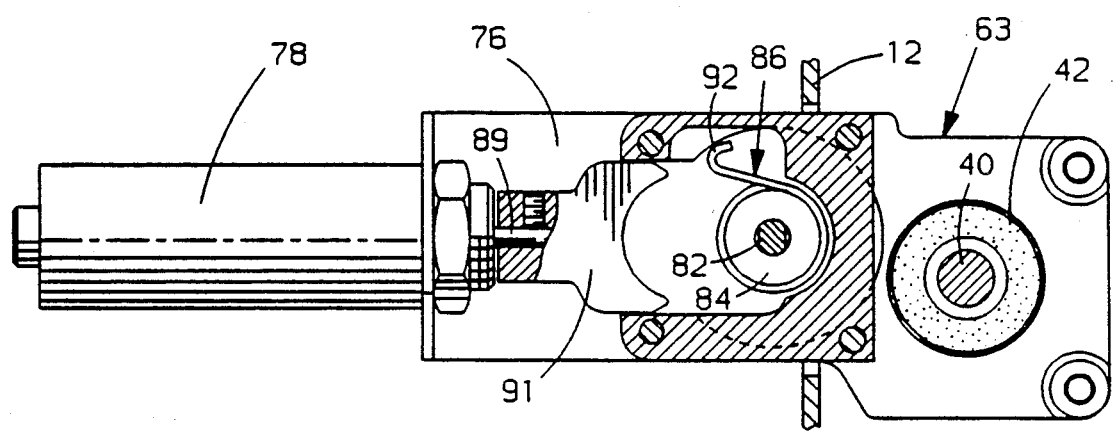
FIG. 4 is a view taken along line 4—4 of FIG. 3.

Referring to FIGS. 1-7 the drum brake assembly 7 of the present invention has a conventional brake drum 10 (an outline of which is shown) which is provided for connection to the vehicle wheel. Mounted to the vehicle is the backing plate 12 traditionally mounted to the axial housing. Mounted by a spring loaded pin to bias them towards the mounting plate are secondary 22 and primary 21 shoes. The spacing between the primary and secondary screws is adjustably set by a screw and starwheel type adjuster 24 which is acted upon by a pawl 26 which is also pivotally connected with the backing plate 12. A spring 28 holds the primary 21 and secondary 22 shoes together on the top and surrounds the adjuster 24. At their lower ends the primary 21 and secondary 22 shoes contact an anchor 30 with pins 31 and 32 which is fixed with respect to the backing plate 12. During actuation the primary and secondary shoes split apart from one another away from the bottom anchor 30. A bisecting line 34 the brake assembly 7 will separate the anchor 30 from the adjuster 24. Rotatively mounted to the backing plate in position by a bearing 96 is a power screw 40. The power screw 40 is covered by a boot 42 and is threadably engaged with a non-rotative nut 44. The nut is keyed a 46 into a frame 48 to prevent its rotation. The frame 48 has an extension 50 (FIG. 5) which is pivotally connected to an apply lever 52. The apply lever 52 is of the shape of a bent arm and has a loss motion pivotal connection with the backing plate intermediate the two anchors pins 32 and 31 for the primary and secondary shoes via a pin.

Each brake shoe has a return spring 60 urging that shoe towards the anchor 30. The apply lever has pivotal movement with respect to the shoes 21, 22 by the shoe actuators 62, 64 which contact portions of the shoes. Movement of the non-rotative nut 44 to the right, (towards a retracted position) as shown in the drawings, will cause the lever 52 to be pulled by the nut 44 for clockwise rotation causing the shoes 21, 22 to be contacted and separated in an outward direction. The return spring 60 will cause the shoes to return to the non-actuated position. The adjuster 24 screw acted upon by the adjuster pawl 26 lever which is held by an adjuster pawl link 68 and will turn the adjuster nut 70 upon actuation of the wheel brake 7. A frame 63 is provided which mounts a motor to the backing plate 12. An extension 76 of that frame mounts a mechanical hydraulic or thermal actuator 78. A pinion 86 of a gear train is connected to the shaft (rotor) of the motor 74. Motor 74 powers the drive screw via gears 80 and 100. Connected to the motor shaft 82 is the parking brake drum 84. Surrounding the parking brake drum is a coil spring 86 which has one end 90 which is generally grounded. The spring is configured in such manner that rotation of the motor in a direction to rely relief of the brake to the non-activated position will cause the motor drum 84 to wrap in the spring 86 and be restrained from rotation. Therefore, once activated the brake shoes 21,22 remain activated. To allow the relief of the activation of the brake shoes 21, 22 there is a linear actuator rod 89 with a hand 91 operatively associated with the free end 92 of the spring. Extention of rod 89 make hand 91 contact the free end 92 of the coil spring 86, moving the pins to an unwinding position, therefore allowing free motion of the motor 74. This actuator 78 is either a hydraulic actuator or it can be a thermal actuator which uses a ceramic heater to heat a substance which impacts upon a diaphragm connected with the rod. Typically, the system will be configured in such a manner that if a thermal actuator is utilized either the system will be such that electric current is needed to allow the brake to relieve or electric current will be needed to allow the wheels to initially relieve, however, there will be magnetic latchins (sometimes referred to as a latch or lock) which will allow the actuator to be extended without a continual drain of current.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property of privilege is claimed are defined as follows:

1. An automotive vehicle drum brake comprising:
a brake drum for connection to said wheel,
a backing plate for connection to said vehicle;
at least one brake shoe connected with said backing plate and pivotally mounted with respect thereto;
a non-rotative nut mounted for linear motion with respect to said backing plate and having means of pivotal connection with said brake shoe;
an apply lever pivotally connected with said nut, said apply lever having an activator wherein pivotal movement of said lever causes said actuator to contact said brake shoe and to pivot the same;
a power screw threadably engaged with said nut, said power screw being mounted to said plate; and
an electric motor means torsionally connected with said power screw to turn the same to actuate said brakes.

2. A brake as described in claim 1 having two brake shoes in contact with said lever actuator.

3. A brake as described in claim 2 wherein said brake has an adjuster for adjustably setting the distance between said shoes, said adjuster being on an opposite side of a line bisecting said brakes, said anchor is on and being on the same side of said brake said power screw is mounted on.

4. A brake as described in claim 1 wherein a line bisecting said brake has an anchor for said brake shoe on one end and said power screw on thee other end of said bisecting line.

5. A brake as described in claim 1 wherein said power screw is connected by a gear train with said motor and wherein said motor has a rotor mounted generally parallel with said power screw.

6. A brake as described with claim 5 wherein a smaller pinion gear is connected with said motor.

7. A brake as described in claim 1 wherein said lever has a lost motion connection with said plate generally on the opposite end of said lever connection with said nut.

8. A brake as described in claim 1 further including a drum connected with a rotor of said motor said drum being surrounded by a coil spring grounded at one end, and wherein activation of said motor in a direction to release said brake causes said drum to wind and be restrained from rotation by said spring and wherein said brake has a linear actuator operatively associated with another end of said spring for moving said spring into a position generally unwinding said spring and restraining said spring frame engagement of said drum.

9. A brake as described in claim 8 wherein said actuator is a linear actuator.

10. An brake as described in claim 8 wherein said actuator is powered by a fluid.

11. A brake as described in claim 8 wherein said actuator is a thermal actuator.

12. A brake as described in claim 1 wherein said lever is pulled on to apply said brake shoes into said drum.

* * * * *